(12) United States Patent
Tsai et al.

(10) Patent No.: US 9,004,894 B2
(45) Date of Patent: Apr. 14, 2015

(54) MOLD ASSEMBLY

(75) Inventors: Yuan-Shun Tsai, New Taipei (TW);
Yu-Cheng Hsu, New Taipei (TW)

(73) Assignee: Pioneer Material Precision Tech Co., Ltd., Wugu Dist., New Taipei (TW)

( * ) Notice: Subject to any disclaimer, the term of this patent is extended or adjusted under 35 U.S.C. 154(b) by 671 days.

(21) Appl. No.: 13/117,110

(22) Filed: May 26, 2011

(65) Prior Publication Data
US 2012/0171317 A1 Jul. 5, 2012

Related U.S. Application Data

(60) Provisional application No. 61/428,822, filed on Dec. 30, 2010.

(51) Int. Cl.
| | | |
|---|---|---|
| *B29C 45/14* | (2006.01) | |
| *B29C 33/40* | (2006.01) | |
| *B29C 45/37* | (2006.01) | |
| *B29C 33/56* | (2006.01) | |

(52) U.S. Cl.
CPC ......... *B29C 45/14836* (2013.01); *B29C 33/405* (2013.01); *B29C 45/14* (2013.01); *B29C 45/14065* (2013.01); *B29C 2045/14122* (2013.01); *B29C 45/37* (2013.01); *B29C 33/565* (2013.01); *B29C 2045/14934* (2013.01)

(58) Field of Classification Search
CPC ..................... B29C 2045/14934; B29C 45/14; B29C 45/14836; B29C 33/405
USPC .......................................................... 425/116
See application file for complete search history.

(56) References Cited

U.S. PATENT DOCUMENTS

| | | | |
|---|---|---|---|
| 2002/0180105 A1* | 12/2002 | Saito et al. ..................... | 264/266 |
| 2011/0155341 A1* | 6/2011 | Li et al. ............................ | 164/80 |

FOREIGN PATENT DOCUMENTS

| | | | | |
|---|---|---|---|---|
| FR | 2 485 987 | 1/1982 | | |
| JP | S6367125 A | 3/1988 | | |
| JP | H047979 | 2/1992 | | |
| JP | H07-117061 | * 5/1995 | ............. | B29C 39/10 |
| JP | H07117061 A | 5/1995 | | |

* cited by examiner

*Primary Examiner* — Yogendra Gupta
*Assistant Examiner* — Kimberly A Stewart
(74) *Attorney, Agent, or Firm* — Winston Hsu; Scott Margo

(57) ABSTRACT

A mold assembly for insert-molding a heterogeneous object includes an upper mold and a lower mold. The upper mold includes a cavity for accommodating an insert object. The lower mold includes a rigid body and a resilient contact member for resting the insert object. The resilient contact member absorbs dimensional variations of the insert object during the insert molding process.

12 Claims, 9 Drawing Sheets

US 9,004,894 B2

MOLD ASSEMBLY

CROSS REFERENCE TO RELATED APPLICATIONS

This application claims the benefit of U.S. provisional application No. 61/428,822 filed 2010 Dec. 30.

BACKGROUND OF THE INVENTION

1. Field of the Invention

The present invention relates generally to a mold assembly, and more specifically to a mold assembly having at least a resilient contact member particularly suited for the art of applying an insert-molding to a heterogeneous object.

2. Description of the Prior Art

FIG. 1 and FIG. 2 are cross-sectional views of a conventional mold assembly. A rigid mold assembly 100 is used for insert-molding a part 10 such as a heterogeneous object, wherein the material of the rigid mold assembly 100 may be metal such as aluminum, iron, steel etc. The rigid mold assembly 100 has an upper mold 110 and a lower mold 120, and an inner space 130 is formed between the upper mold 110 and the lower mold 120. The part 10 may include a non-elastic part 2 and an elastic part 4 combined with the non-elastic part 2, wherein the non-elastic part 2 may be non-polymer elastomer such as metal, ceramic, glass, plastic etc. and the materials of the elastic part 4 may be polymer elastomer such as synthetic rubbers, silicon gel etc. A method of forming the part 10 may be: disposing the non-elastic part 2 in the inner space 130, then injecting the polymer elastomer into the inner space 130 and curing the polymer elastomer, at which point the part 10 is completed.

The drawback of the above prior art method is: clearance or interference between the part 10 and the rigid mold assembly 100 occurs due to self-dimensional variation of the non-elastic part 2, deformation of the non-elastic part 2 caused by thermal expansion, or hardness of the non-elastic part 2. For example, as shown in the circular, enlarged view of FIG. 1, when the size of the non-elastic part 2 is too small, the gap 140 occurs between the non-elastic part 2 and the lower mold 120. The gap 140 will lead to overflow of the injected polymer elastomer which may be difficult to clean in post processing. As a result, the processing yield is reduced. Furthermore, as shown in the circular, enlarged view of FIG. 2, when the size of the non-elastic part 2 is too big, interference occurs between the non-elastic part 2 and the lower mold 120, thereby damaging the appearance of the non-elastic part 2. The interference between the part 10 and rigid mold assembly 100 can also occur due to thermal expansion during the insert-molding process, so that the appearance of the part 10 may be damaged.

FIG. 3 is a cross-sectional view of another conventional mold assembly. The elastic part 4 is combined on two sides of the non-elastic part 2, and the upper side A1 and the lower side A2 of the non-elastic part 2 respectively contact the upper mold 110 and the lower mold 120. Due to the lack of resilience and deformation capability of the non-elastic part 2, upper mold 110, and lower mold 120, the non-elastic part 2 is easily crushed or damaged by the upper mold 110 and the lower mold 120 when the size of the non-elastic part 2 is too big. On the other hand, as shown in FIG. 4, when the size of the non-elastic part 2 is too small, overflow of the polymer elastomer will occur after mold-locking.

Therefore, an improved mold assembly is needed, wherein a part having dimensional accuracy is formed without hurting the structure or the appearance of the part.

SUMMARY OF THE INVENTION

The present invention provides a mold assembly having at least a resilient contact member to solve the problems and the drawbacks of the prior art.

The present invention provides a mold assembly for insert-molding a heterogeneous object, including an upper mold and a lower mold. The upper mold includes a cavity for accommodating an insert object. The lower mold includes a rigid body and a resilient contact member. The insert object is disposed on the resilient contact member during an insert molding process, such that the resilient contact member absorbs a dimensional variation of the insert object during the insert molding process.

The present invention provides a mold assembly, including an upper mold and a lower mold. The upper mold includes a first rigid body and a first resilient contact member. The lower mold includes a second rigid body and a second resilient contact member. The upper mold and the lower mold, when combined together, define an inner space for accommodating an insert object, wherein the insert object contacts both the first resilient contact member and the second resilient contact member, thereby absorbing a dimensional variation of the insert object.

According to the above, the present invention provides a mold assembly having at least a resilient contact member using for contacting an insert object accommodated in the mold assembly, such that the insert object does not contact the rigid part of the mold assembly. As a polymer elastomer injected into the mold assembly to form a heterogeneous object forming by bonding the insert object with polymer elastomer, overflow of the polymer elastomer or damage of the insert object caused by dimensional variation of the insert object will not occur.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
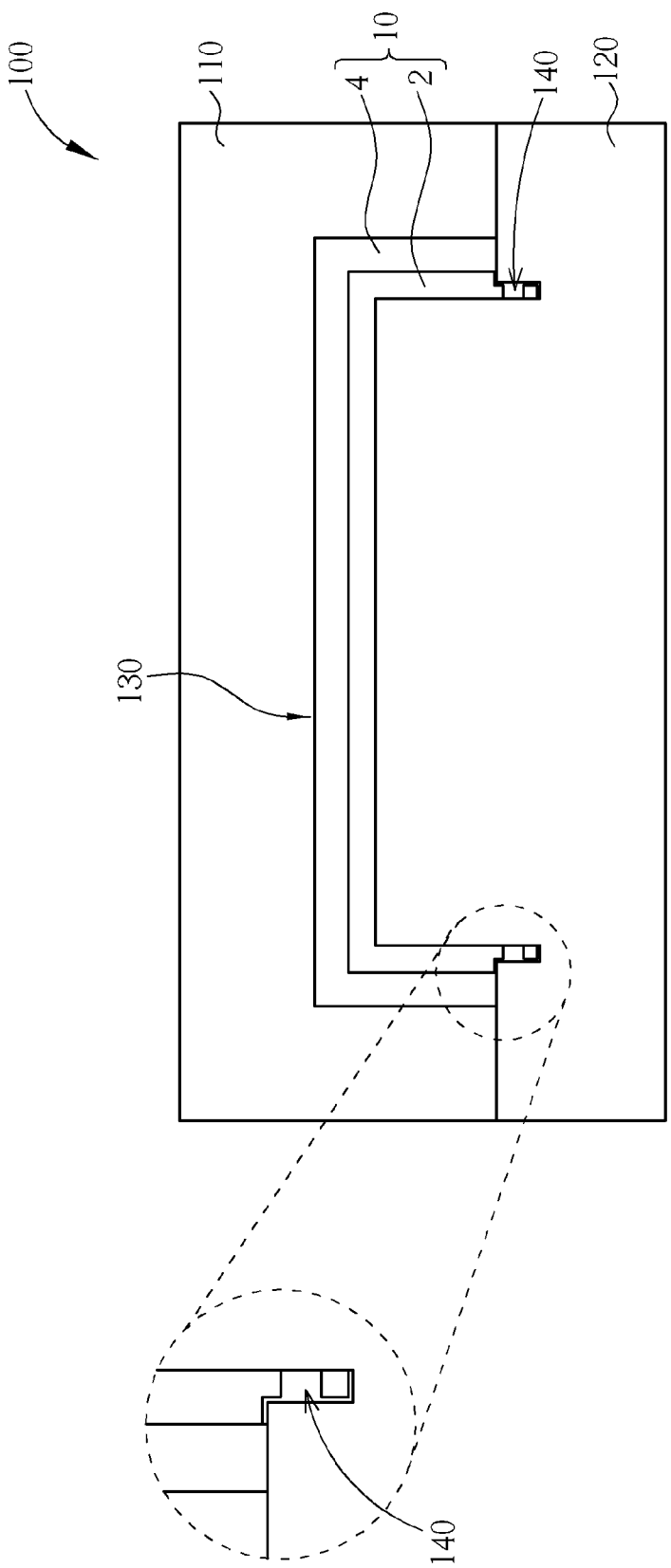
FIG. 1 and FIG. 2 are cross-sectional views of a conventional mold assembly.
Figure 2:
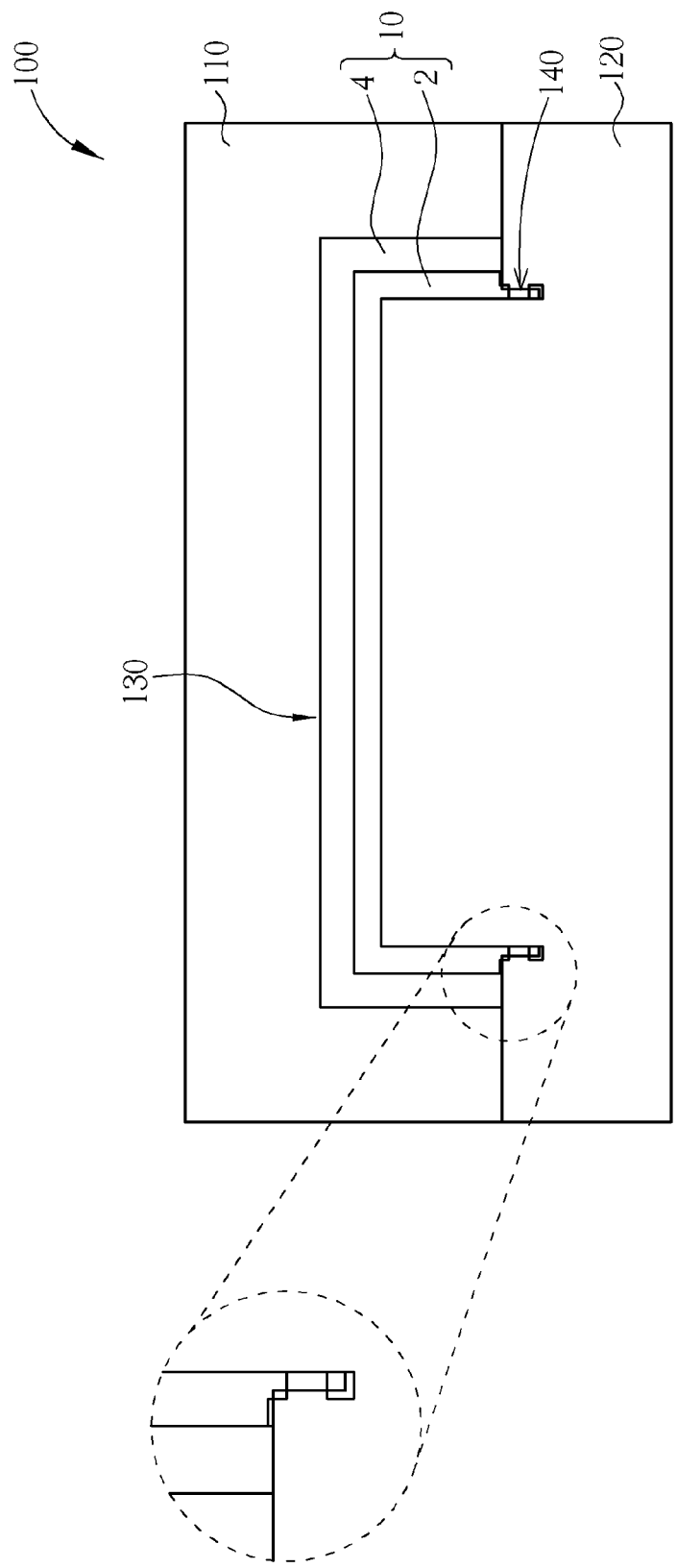
Figure 3:
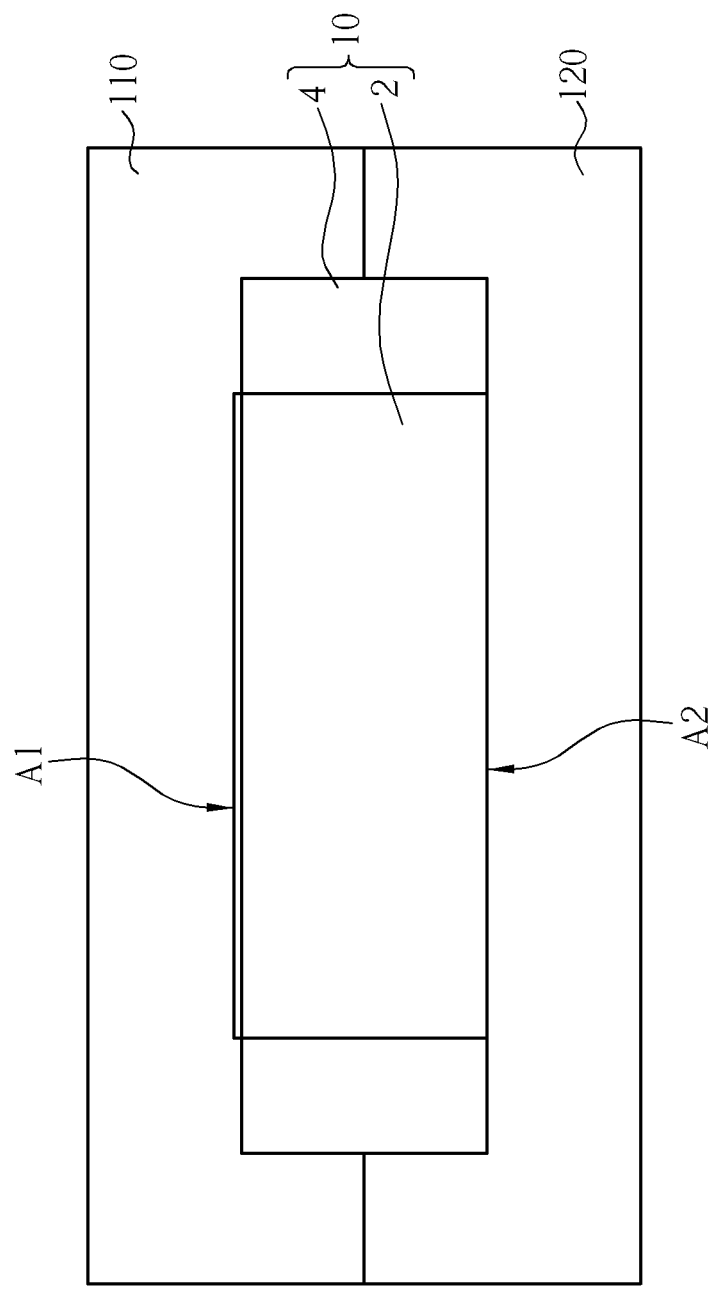
FIG. 3 and FIG. 4 are cross-sectional views of another conventional mold assembly.
Figure 4:
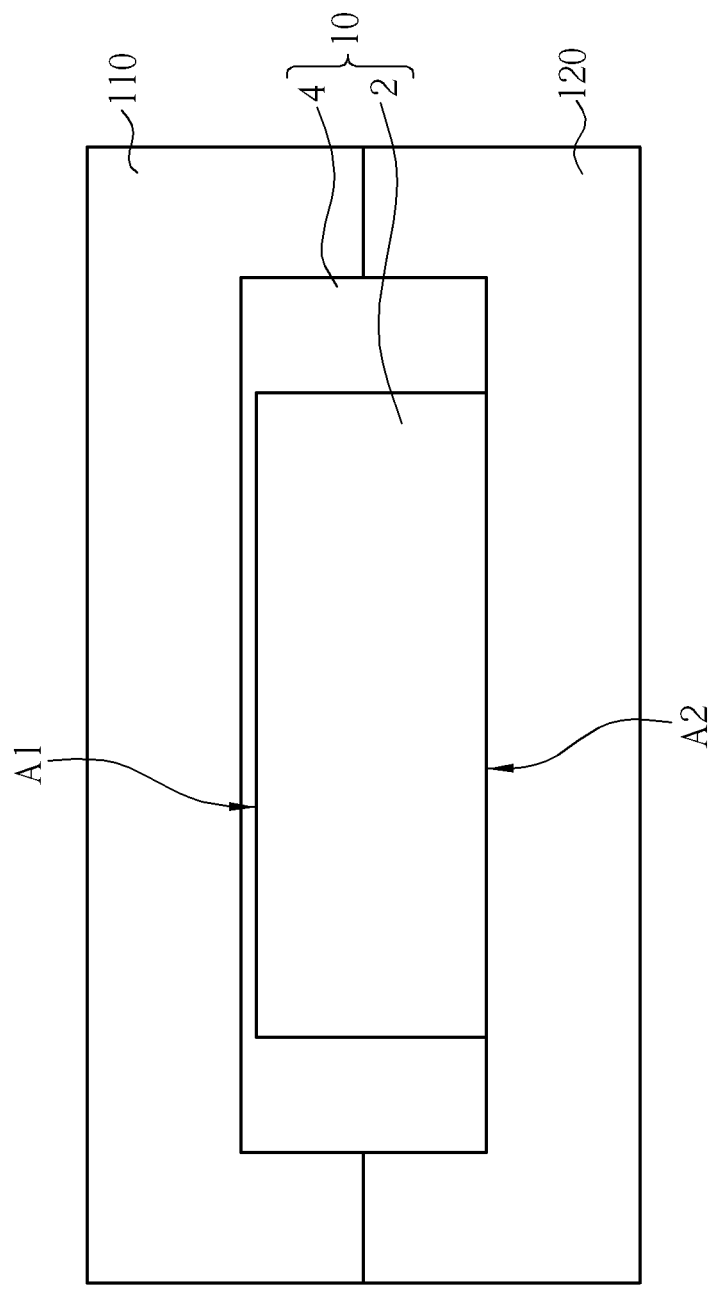
Figure 5:
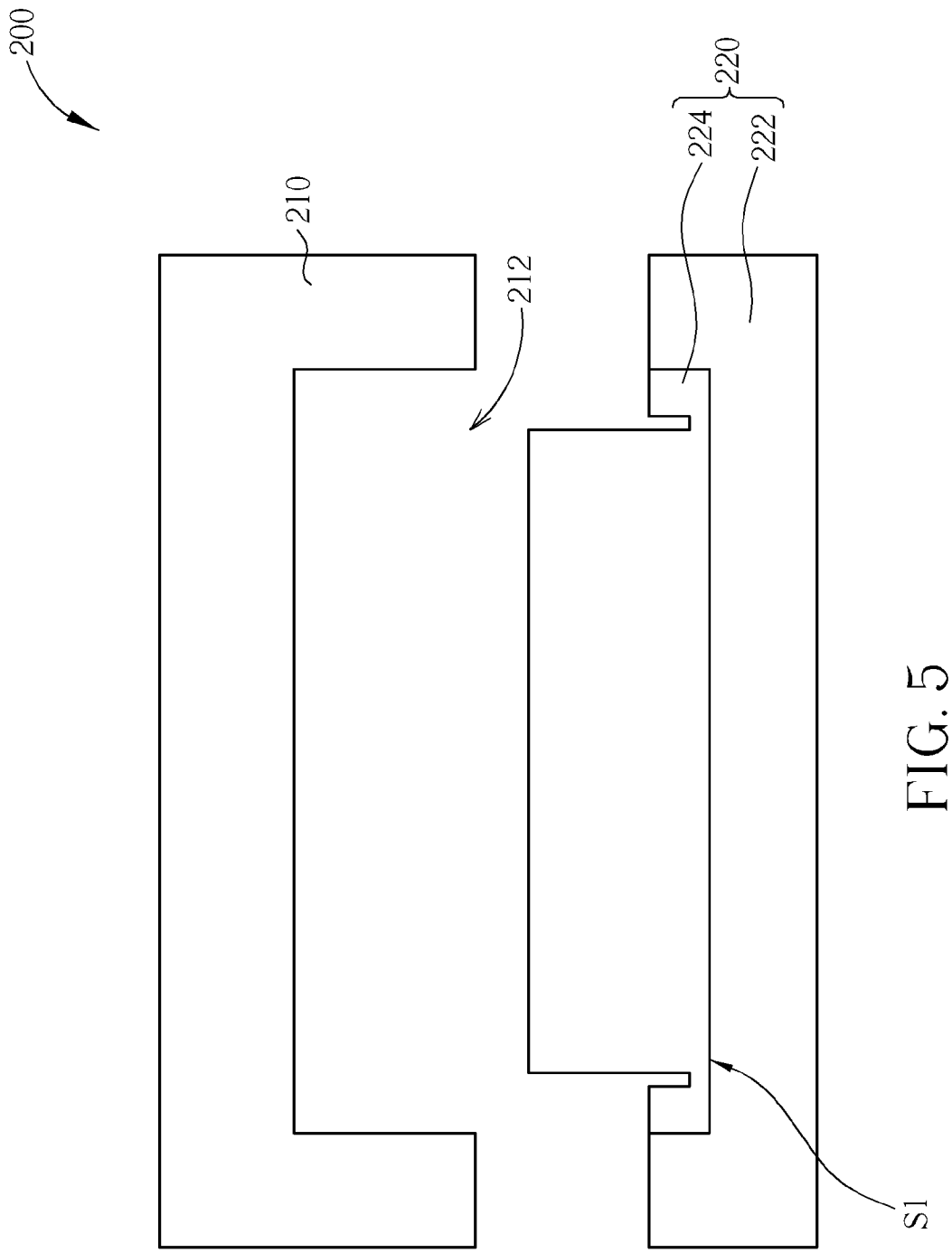
FIG. 5 depicts a cross-sectional view of a mold assembly in accordance with a first embodiment of the present invention.

FIG. 5 depicts a cross-sectional view of a mold assembly in accordance with a first embodiment of the present invention.

Figure 6:
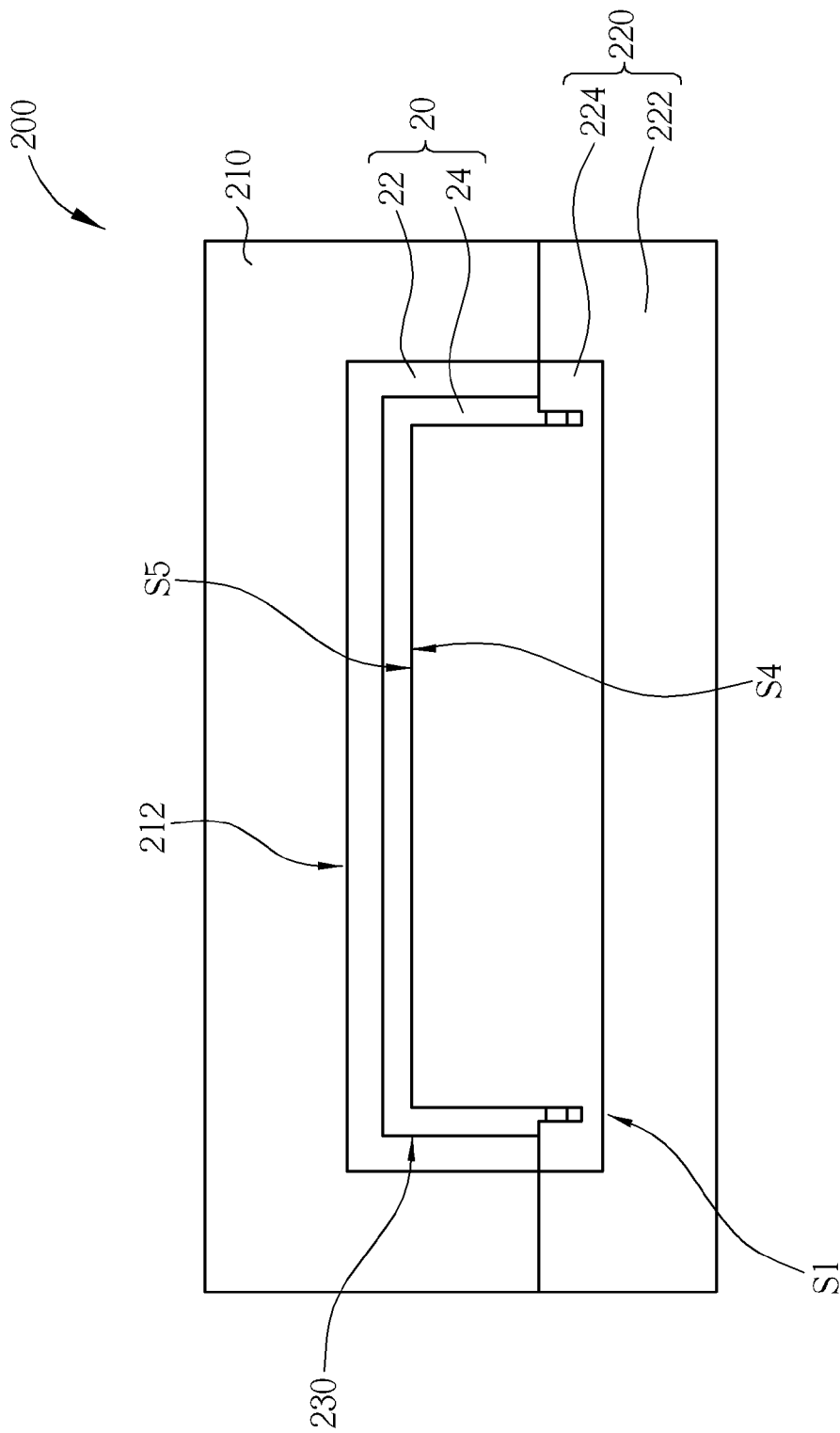
FIG. 6 depicts a cross-sectional view of the mold assembly of FIG. 5 after die locking.

FIG. 6 depicts a cross-sectional view of the mold assembly of FIG. 5 after die locking. As shown in FIG. 5 and FIG. 6, the mold assembly 200 includes an upper mold 210 and a lower mold 220. The lower mold 220 includes a rigid body 222 and a resilient contact member 224 located on an inner side S1 of the rigid body 222. The upper mold 210 includes a cavity 212 for accommodating an insert object 24. The insert object 24 is disposed on the resilient contact member 224. The upper mold 210 and the lower mold 220, when combined together, define an inner space 230. The mold assembly 200 is not limited to the upper mold 210 and the lower mold 220 and the mold numbers of the mold assembly 200 depend on actual demands. The relative position of the upper mold 210 and the lower mold 220 can also change according to requirements. The polymer elastomer 22 is injected into the inner space 230 to fill the inner space 230. After the polymer elastomer 22 is cured, the polymer elastomer 22 bonds with the insert object 24 to form a heterogeneous object 20. The dimensional variation of the insert object 24 can be absorbed during an insert-molding process due to the material of the resilient contact member 224 being an elastic material, wherein the dimensional variation of the insert object 24 may be generated during manufacturing processes or generated by expansion and contraction during insert-molding processes. When the size of the insert object 24 is too small, the resilience of the resilient contact member 224 means the insert object 24 allows slightly pressing forces to fill the space without any clearance, therefore avoiding overflow of the injected polymer elastomer 22. In contrast, when the size of the insert object 24 is too big, the insert object 24 can also allow more deformation than when contacting with rigid materials because of the compression characteristic of the resilient contact member 224, therefore the dimensional variation of the insert object 24 which can cause interference is absorbed without damaging the structure or the appearance of the insert object 24. As a result, the present invention provides the mold assembly 200 for insert-molding a heterogeneous object 20 that can improve the processing yield.

Specifically, the materials of the upper mold 210 and the rigid body 222 may be rigid materials such as aluminum, steel, metal alloys etc. In a preferred embodiment, the upper mold 210 and the rigid body 222 are high-temperature proof materials that can resist the molding temperature during insert-molding process. The resilient contact member 224 and the polymer elastomer 22 are composed of polymer elastic materials such as silica gel, plastic, synthetic rubber, resins etc. It should be noted that the resilient contact member 224 and the polymer elastomer 22 are made of different materials so that the resilient contact member 224 and the polymer elastomer 22 will not combine to form one piece during the insert molding process. For example, the polymer elastomer 22 may be composed of silica gel while the resilient contact member 224 is composed of a synthetic rubber, or the polymer elastomer 22 may be composed of a synthetic rubber while the resilient contact member 224 is composed of silica gel. In other words, the polymer elastomer 22 and the resilient contact member 224 cannot both be silica gel or synthetic rubbers at the same time. The reason is that the polymer elastomer 22 injected into molds during the insert-molding process is molten, so it will combine with the insert object 24 after curing. As a result, the polymer elastomer 22 and the insert object 24 would melt and combine into one piece, leading to the heterogeneous object 20 being unable to be mold released after molding.

Figure 7:
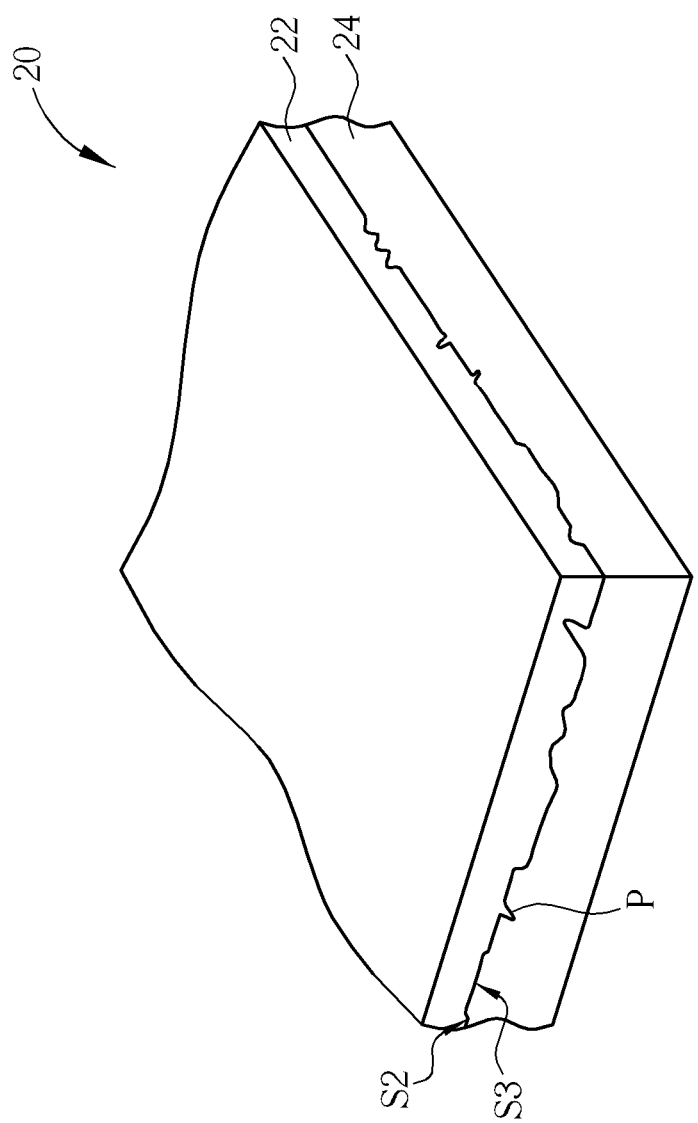
FIG. 7 depicts a three-dimensional side view of a heterogeneous object in accordance with an embodiment of the present invention.

FIG. 7 depicts a three-dimensional side view of a heterogeneous object in accordance with an embodiment of the present invention. In this embodiment, the heterogeneous object 20 may be a notebook or cell phone having a polymer elastomer 22 and an insert object 24, wherein the insert object 24 may be a portion of a case of a notebook or a cell phone, and the polymer elastomer 22 may be a soft film covering the case. In other embodiments, the heterogeneous object 20 may be other parts and is not limited thereto. The patterned surface S2 of the polymer elastomer 22 tightly combines with the corresponding patterned surface S3 of the insert object 24, wherein the material of the polymer elastomer 22 may be a polymer elastic material such as silicon gel, rubber, etc., and the material of the insert object 24 may be a non-polymer elastic material such as aluminum alloy, plastic steel, plastic, ceramic or glass. The relative position of the polymer elastomer 22 and the insert object 24 may change as long as the materials of the polymer elastomer 22 and the insert object 24 are different. Additionally, the shape, the size and the numbers of the pattern P using for fixing and bonding the polymer elastomer 22 with the insert object 24 depend upon practical considerations.

As shown in FIG. 6, a profile of a contact surface S4 of the resilient contact member 224 conforms to a bottom surface S5 of the insert object 24. That is, the resilient contact member 224 and the insert object 24 can be combined with the largest contact area, therefore sliding, gaps or interference between the resilient contact member 224 and the insert object 24 leading to overflow of the polymer elastomer 22 or damage of the insert object 24 during insert molding process is avoided. In a preferred embodiment, the insert object 24 does not contact the upper mold 210 or the rigid body 222, so that clearance or interference during molding caused by lack of resilience and deformation of the insert object 24, the upper mold 210 and the rigid body 222 is avoided.

Figure 8:
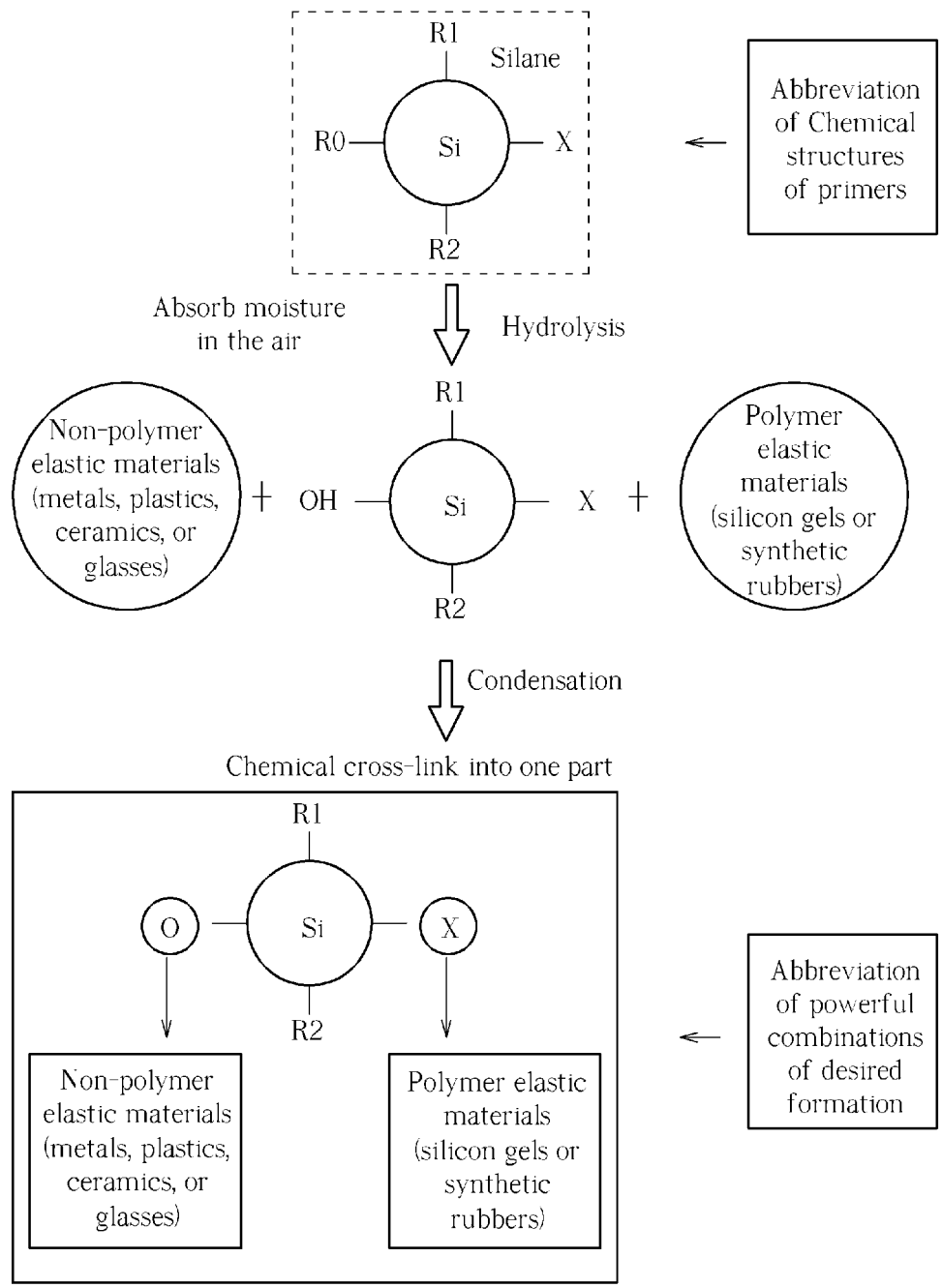
FIG. 8 depicts a combination principle of a primer in accordance with an embodiment of the present invention.

In a preferred embodiment, the resilient contact member 224 may be fixed on the inner side S1 of the rigid body 222 for avoiding misalignment of the insert object 24 above the resilient contact member 224 due to dislocation of the resilient contact member 224 caused by expansion and contraction in a high temperature process or temperature changing environment. Specifically, the resilient contact member 224 can bond with the rigid body 222 via a primer. One kind of combination principle of the primer is shown in FIG. 8, wherein —OH bonding generated after silane primers hydrolyzing can bond with non-polymer elastomers such as metal, ceramic, glass, plastic etc., so that the resilient contact member 224 and the rigid body 222 can combine with high bonding strength and still have good dimensional stability after repeated operations. Durability of the mold assembly 200 improves significantly. It should be noted that the present invention is not limited to using primers between the resilient contact member 224 and the rigid body 222. As the molding shape is not complicated, the resilient contact member 224 having high temperature resistance can be formed first and then embedded into the mold assembly 200 as a portion of the mold assembly 200. The benefit of the forming method is that the resilient contact member 224 can be replaced faster than in the prior art. Furthermore, the insert object 24 and the polymer elastomer 22 may be combined via the primer shown in FIG. 6. In doing so, the insert object 24 and the polymer elastomer 22 can be formed stably and the size accuracy of the insert object 24 and the polymer elastomer 22 can be maintained after molding. Due to the strong combination between the insert object 24 and the polymer elastomer 22, the durability of the heterogeneous object 20 improves. It is further mentioned herein that the primer bonding the resilient contact member 224 and the rigid body 222 is not always the same as the primer bonding the insert object 24 and the polymer elastomer 22, and depends on the characteristics of the materials of these components.

Figure 9:
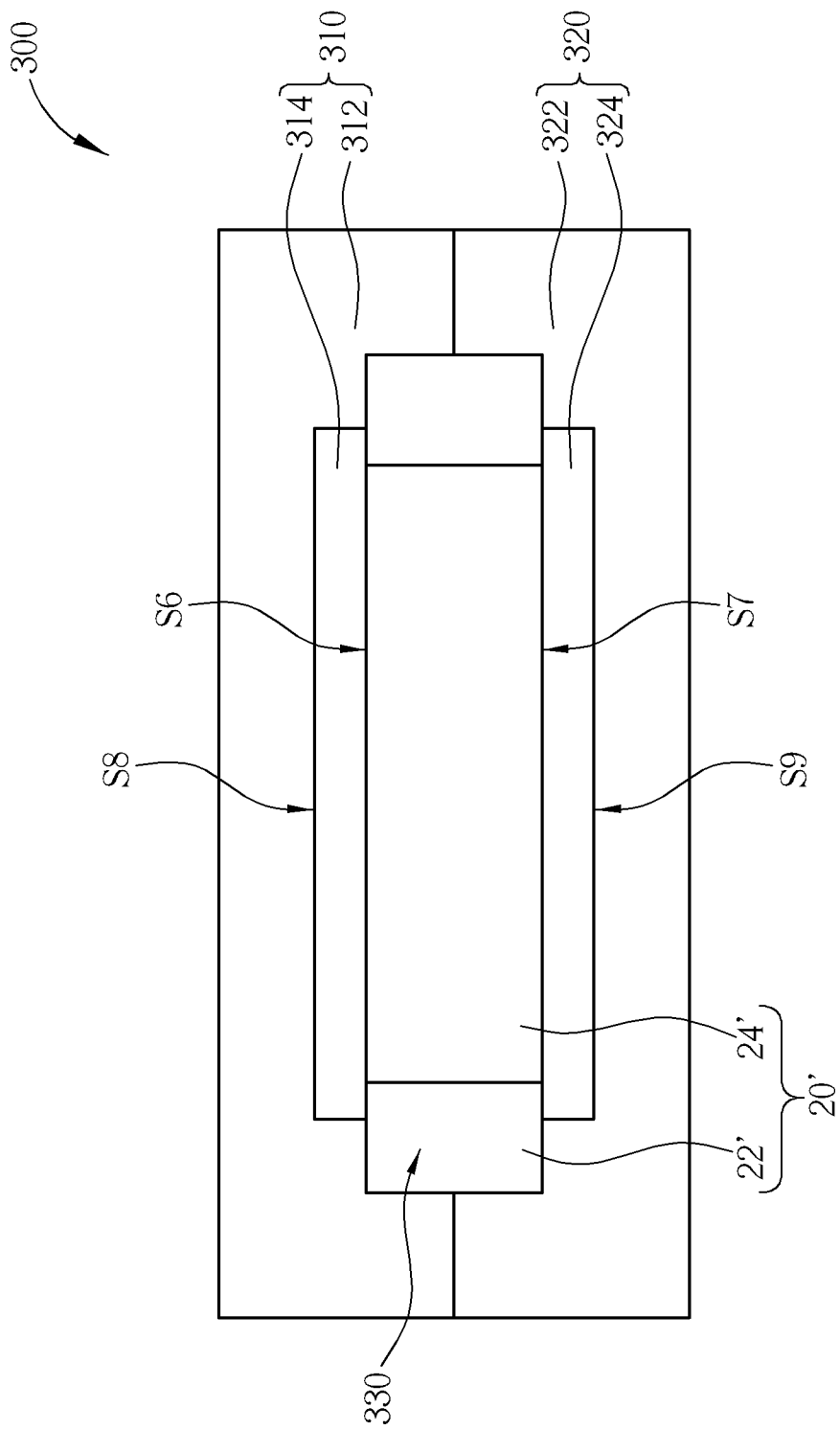
FIG. 9 depicts a cross-sectional view of a mold assembly in accordance with a second embodiment of the present invention.

FIG. 9 depicts a cross-sectional view of a mold assembly in accordance with a second embodiment of the present invention. As shown in FIG. 9, the mold assembly 300 includes an upper mold 310 and a lower mold 320. The upper mold 310 includes a first rigid body 312 and a first resilient contact member 314, and the lower mold 320 includes a second rigid body 322 and a second resilient contact member 324. In this embodiment, the upper mold 310 and the lower mold 320 have upper and lower symmetry, but they also can be a non-symmetrical structure in another embodiment. The mold assembly 300 is not limited to including only the upper mold 310 and the lower mold 320, and the mold numbers of the mold assembly 300 may change according to requirement. The relative position of the upper mold 310 and the lower mold 320 can also change according to requirement. As the upper mold 310 and the lower mold 320 are combined together, an inner space 330 for accommodating an insert object 24' is defined. After the insert object 24' is disposed in the inner space 330, a polymer elastomer 22' is injected into the inner space 330 to fill the remaining space of the inner space 330, so that the polymer elastomer 22' bonds with the insert object 24' to form a heterogeneous object 20'. In this embodiment, the first resilient contact member 314 and the second resilient contact member 324 clamp the insert object 24' thereby absorbing dimensional variations of the insert object 24'. In this way, when the size of the insert object 24' is too small so that clearance is generated between the upper mold 310 and the insert object 24' or between the lower mold 320 and the insert object 24', or when the insert object 24' is too big so that interference is generated between the upper mold 310 and the insert object 24' or between the lower mold 320 and the insert object 24', the overflow of the polymer elastomer 22' or the damage of the insert object 24' are avoided because of the resilience of the first resilient contact member 314 and the second resilient contact member 324.

Likewise, the first rigid body 312 and the second rigid body 322 may be composed of rigid materials such as metal, alloy etc. The insert object 24' includes non-polymer materials such as metal, plastic, ceramic, glass etc. The first resilient contact member 314, the second resilient contact member 324 and the polymer elastomer 22' may be polymer elastic materials such as silicon gel, plastic, synthetic rubber, resin etc. The first resilient contact member 314 and the second resilient contact member 324 may be composed of different materials, and the first rigid body 312 and the second rigid body 322 may be composed of different materials as well, depending upon requirements. It should be noted that the materials of the first resilient contact member 314 and the second resilient contact member 324 are different from the materials of the polymer elastomer 22', because the polymer elastomer 22' respectively contacts the first resilient contact member 314 and the second resilient contact member 324. For example, the polymer elastomer 22' may be composed of silicon gel while the first and the second resilient contact member 314, 324 are composed of synthetic rubber, or the polymer elastomer 22' may be composed of synthetic rubber while the first and the second resilient contact member 314, 324 are composed of silicon gel, but the invention is not limited thereto. The reason is that the polymer elastomer 22' injected into molds during the insert-molding process is molten, so it will combine with the first resilient contact member 314 or the second resilient contact member 324 as the material of the polymer elastomer 22' is the same as the materials of the first resilient contact member 314 or the second resilient contact member 324. As a result, the polymer elastomer 22' and the first resilient contact member 314 or the second resilient contact member 324 will melt and combine into one piece, leading to the heterogeneous object 20' being unable to be mold released after molding.

In a preferred embodiment, the profile of the first resilient contact member 314 and the second resilient contact member 324 conforms to the interface S6, S7 of the insert object 24' for fixing the relative position of the insert object 24' and the first and the second resilient contact member 314, 324. This avoids clearance between the first resilient contact member 314 and the insert object 24' or the second resilient contact member 324 and the insert object 24', and avoids interference between the first rigid body 312 and the insert object 24' or the second rigid body 322 and the insert object 24' caused by the slide of the insert object 24'.

In a preferred embodiment, the first resilient contact member 314 is fixed on the inner side S8 of the first rigid body 312, or the second resilient contact member 324 is fixed on the inner side S9 of the second rigid body 322. Therefore, misalignment of the insert object 24, due to dislocation of the first resilient contact member 314 or the second resilient contact member 324 caused by expansion and contraction in a high temperature process or temperature changing environment, is avoided. The first resilient contact member 314 or the second resilient contact member 324 can respectively bond with the first rigid body 312 or the second rigid body 322 via a primer, wherein the primer makes the first resilient contact member 314 or the second resilient contact member 324 combine with the first rigid body 312 or the second rigid body 322 with high bonding strength while still retaining good dimensional stability after repeated operations. Thereby, durability of the mold assembly 300 is improved. It should be noted that the present invention is not limited to using primers between the first resilient contact member 314 or the second resilient contact member 324 and the first rigid body 312 or the second rigid body 322. The insert object 24' and the polymer elastomer 22' may also be combined by the primer shown in FIG. 6. Furthermore, the primer which bonds the first resilient contact member 314 or the second resilient contact member 324 to the first rigid body 312 or the second rigid body 322 is not always the same, depending on the characteristics of the materials used.

In another preferred embodiment, the insert object 24' does not contact the first rigid body 312 or the second rigid body 322, so that clearance or interference caused by the lack of resilience and deformation capability of the rigid materials can be avoided.

According to the above, the present invention provides a mold assembly having an upper mold and a lower mold. At least a resilient contact member, more specifically a polymer resilient contact member, located on the inner side of the upper mold or the lower mold is used for contacting an insert object accommodated in the mold assembly. In this way, the insert object does not directly contact the rigid material parts of the mold assembly, so that overflow of the polymer elastomer or damage of the insert object caused by clearance or interference generated by dimensional variations of the insert object is avoided. The polymer elastomer is injected into the mold assembly and bonds with an insert object to form a heterogeneous object, wherein the polymer resilient contact member and the injected polymer elastomer are made of different materials, which prevents the polymer resilient contact member and the injected polymer elastomer from combining into one piece and causing difficulty in mold releasing. The present invention also provides primers used for combining the polymer elastomer with the insert object and combining the polymer resilient contact member with the rigid body, which enables the two to have a strong bonding between them, thereby improving durability of the parts or the molds.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mold assembly for insert-molding a heterogeneous object, comprising:
   an upper mold comprising a cavity for accommodating an insert object; and
   a lower mold comprising a rigid body and a resilient contact member, said upper mold being in direct contact with said rigid body, and said rigid body having two inner sidewalls and a bottom surface between said two inner sidewalls to thereby form a recess facing said upper mold, wherein the resilient contact member is fixed within the recess of the rigid body, the resilient contact member does not contact the upper mold, and wherein said inner sidewalls and said bottom surface conforms to and contacts two outer sidewalls and a bottom surface of the resilient contact member, wherein the insert object is disposed on the resilient contact member during an insert molding process, such that the resilient contact member absorbs dimensional variations of the insert object during the insert molding process.

2. The mold assembly for insert-molding a heterogeneous object according to claim 1, wherein the upper mold and the lower mold define an inner space after they are combined together, and wherein a polymer elastomer, which is injected into the inner spacer, bonds with the insert object to form the heterogeneous object.

3. The mold assembly for insert-molding a heterogeneous object according to claim 2, wherein the polymer elastomer and the resilient contact member are composed of different materials.

4. The mold assembly for insert-molding a heterogeneous object according to claim 3, wherein the polymer elastomer is composed of silica gel and the resilient contact member is composed of a synthetic rubber.

5. The mold assembly for insert-molding a heterogeneous object according to claim 3, wherein the polymer elastomer is composed of a synthetic rubber and the resilient contact member is composed of silica gel.

6. The mold assembly for insert-molding a heterogeneous object according to claim 1, wherein the upper mold is a metal upper mold.

7. The mold assembly for insert-molding a heterogeneous object according to claim 1, wherein the rigid body comprises metal.

8. The mold assembly for insert-molding a heterogeneous object according to claim 1, wherein the insert object comprises metal, plastic, ceramic or glass.

9. The mold assembly for insert-molding a heterogeneous object according to claim 1, wherein the resilient contact member is fixed on said two inner sidewalls and said bottom surface of the rigid body.

10. The mold assembly for insert-molding a heterogeneous object according to claim 9, wherein the resilient contact member is bonded on said two inner sidewalls and said bottom surface of the rigid body via a silane primer, wherein —OH bonding generated after said silane primers hydrolyzing forms strong chemical cross-link bonding with the two inner sidewalls and said bottom surface of the rigid body.

11. The mold assembly for insert-molding a heterogeneous object according to claim 1, wherein the insert object does not contact the rigid body as the insert object is disposed on the resilient contact member.

12. The mold assembly for insert-molding a heterogeneous object according to claim 1, wherein a profile of a contact surface of the resilient contact member conforms to a bottom surface of the insert object.

* * * * *